Patented Apr. 15, 1930

1,754,652

UNITED STATES PATENT OFFICE

OTTO SOHST, OF HOCHST-ON-THE-MAIN, GERMANY, ASSIGNOR TO GENERAL ANILINE WORKS, INC., OF NEW YORK, N. Y., A CORPORATION OF DELAWARE

AZO DYESTUFFS AND PROCESS OF PRODUCING THE SAME

No Drawing. Application filed June 26, 1926, Serial No. 118,850, and in Germany July 7, 1925.

My present invention relates to new azo dyestuffs and a process of preparing them.

I have found that dyestuffs, possessing excellent properties as to fastness, are obtained by combining diazotized arylsulfonic acid-o-aminoaryl-alkyl (or aralkyl) amides of the general formula:

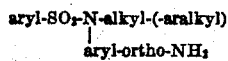

with carboxylic acid-arylamides capable of being coupled such, for instance, as the arylamides of 2.3-oxynaphthoic acid.

The dyestuffs thus obtained may be produced in substance as well as on the fibre or on a substratum.

The arylsulfonic acid-o-aminoaryl-alkyl (or aralkyl) amides above referred to may, for instance, be obtained by causing aryl-sulfo-chlorides to act upon alkyl- (or aralkyl-) ortho-nitro-aryl amines and subsequently reducing the resulting products or by alkylating and reducing the ortho-nitro derivatives obtainable by the method described in German Patent No. 164,130, or they may be produced according to the statements contained in U. S. Patent No. 1,540,164, by the action of arylsulfo-chlorides upon ortho-nitranilines or monoacetyl-o-phenlyene-diamine, alkylation and subsequent reduction or splitting off of the acetyl group.

Among the sulfo-chlorides there may be used in my new process for instance: benzene-sulfo-chloride, p-toluenesulfo-chloride, chlor-benzenesulfochloride, dichlorbenzenesulfo-chloride or the like; among the o-nitro-aryl-amines and monoacetyl-o-diamines for instance: o-nitraniline, m-nitro-p-toluidine, o-nitro-p-alkylhydroxy aniline, o-nitro-p-chlor-aniline, monoacetyl-o-phenylenediamine, monoacetyl-o-toluylenediamine, monoacetyl-o-diaminophenetol or the like.

The following examples serve to illustrate my invention but are not intended to limit it thereto, the parts being by weight:

1. 5,2 parts of benzenesulfonic acid-o-aminophenyl-methylamide are rubbed with 50 parts of water and 7 parts of hydrochloric acid of 20° Bé.; the mixture is cooled with ice and then diazotized in the usual manner with a solution of 1,4 parts of sodium nitrite. The diazo compound first separates as a resinous mass, but solidifies after some time and can then be triturated. The paste thus obtained is introduced, while stirring, into a solution of 6,2 parts of 2.3-oxynaphthoic acid-2'-methyl-1'-anilide in 300 parts of water and 10 parts of caustic soda solution of 40° Bé.

Thus, a scarlet-red precipitate is immediately formed which can be filtered and dried. The dyestuff has most probably the formula:

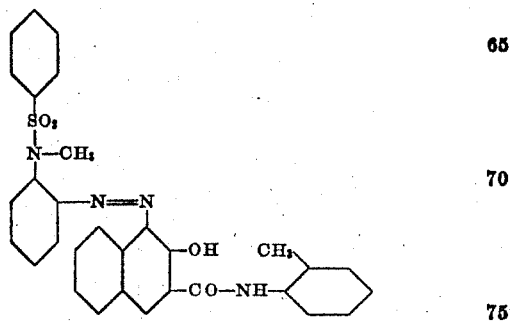

If equivalent quantities of the diazo compounds of other arylsulfo-o-amino-alkylaryl-amides are used and combined with equivalent quantities of other 2.3-oxynaphthoic acid arylamides, similar red precipitates are obtained.

2. For producing a red dyeing there is used a bottoming bath prepared with:

13.2 grams of 2.3-oxynaphthoic acid-4'-chlor-2'-methyl-1'-anilide, 30 cc. of caustic soda solution of 34° Bé., 30 cc. of sodium Turkey-red oil 50% strength, 500 cc. of boiling water, made up with cold water to one litre.

The material is impregnated and developed in a diazotizing bath prepared as follows: 5.2 grams of benzene sulfonic acid-o-amino-phenyl-methylamide are diazotized as indicated in Example 1. The liquor is made up to one liter and before being used is neutralized with 5 grams of sodium acetate. When the developing operation is completed, the material is well washed and soaped at the boil.

Thus, a bright red dyeing of excellent fastness is obtained.

The dyestuff has most probably the following formula:

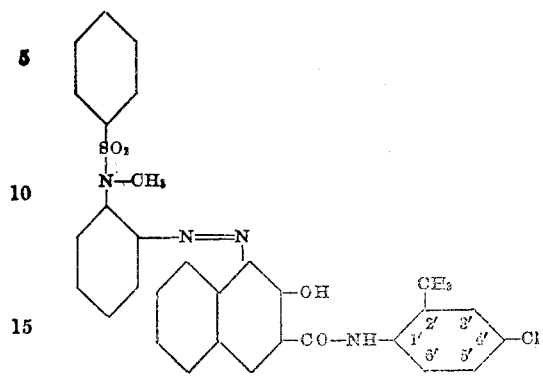

When using for the preparation of the bottoming bath equivalent quantities of other 2.3-oxynaphthoic acid arylamides and developing with equivalent quantities of the diazo compounds of other arylsulfonic acid-o-aminoaryl-alkyl (or aralkyl) amides, there are also obtained dyeings of excellent fastness, the shades of which generally vary from brown-red to yellowish-red to bluish-red.

The following table shows the properties of a number of dyestuffs obtainable by my new process:

|   | Diazotizing base | Coupling components | Shade |
|---|---|---|---|
| No. 1 | 1-toluenesulfone-benzylamino-2-amino-4-methylbenzene → | 2.3-oxynaphthoic-5'-chloro-2'-methyl-1'-anilide | Red |
| No. 2 | 1-toluenesulfone-benzylamino-2-amino-4-methylbenzene → | 2.3-oxynaphthoic acid-α-naphthylamide | Red |
| No. 3 | 1-toluenesulfone-benzylamino-2-amino-4-methylbenzene → | 2.3-oxynaphthoic acid-β-naphthylamide | Red |
| No. 4 | 1-benzenesulfone-methylamino-2-amino-benzene → | 2.3-oxynaphthoic-5'-chloro-2'-methyl-1'-anilide | Red |
| No. 5 | 1-benzenesulfone-methylamino-2-amino-benzene → | 2.3-oxynaphthoic acid-α-naphthylamide | Red |
| No. 6 | 1-benzenesulfone-methylamino-2-amino-benzene → | 2.3-oxynaphthoic acid-β-naphthylamide | Red |
| No. 7 | 1-benzenesulfone-methylamino-2-amino-4-chlorobenzene → | 2.3-oxynaphthoic-5'-chloro-2'-methyl-1'-anilide | Red |
| No. 8 | 1-benzenesulfone-methylamino-2-amino-4-chlorobenzene → | 2.3-oxynaphthoic acid-α-naphthylamide | Red |
| No. 9 | 1-benzenesulfone-methylamino-2-amino-4-chlorobenzene → | 2.3-oxynaphthoic acid-β-naphthylamide | Red |
| No. 10 | 1-benzenesulfone-methylamino-2-amino-4-ethoxy benzene → | 2.3-oxynaphthoic-5'-chloro-2'-methyl-1'-anilide | Red |
| No. 11 | 1-benzenesulfone-methylamino-2-amino-4-ethoxy benzene → | 2.3-oxynaphthoic acid-β-naphthylamide | Red |
| No. 12 | 1-benzenesulfone-methylamino-2-amino-5-ethoxy benzene → | 2.3-oxynaphthoic acid-α-naphthylamide | Bluish-red |
| No. 13 | 1-benzenesulfone-methylamino-2-amino-5-ethoxy benzene → | 2.3-oxynaphthoic acid-β-naphthylamide | Bluish-red |
| No. 14 | 2-benzenesulfone-methylamino-1-amino-naphthalene → | 2.3-oxynaphthoic acid-β-naphthylamide | Claret-red |

I claim:

1. Process consisting in causing the diazo compound of a base of the general formula:

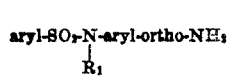

wherein $R_1$ stands for an alkyl or aralkyl group, and wherein the hydrogen atoms of the aryl groups may be substituted, to act upon an acid amide of the following composition:

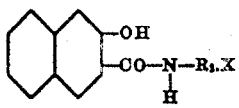

wherein X stands for hydrogen or the atomic grouping

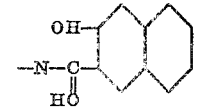

and $R_2$ for an aryl group the hydrogen atoms of which may be substituted.

2. Process consisting in causing the diazo compound of a base of the general formula:

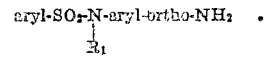

wherein $R_1$ stands for an alkyl or aralkyl group, and wherein the hydrogen atoms of the aryl groups may be substituted, to act upon an acid amide of the following composition:

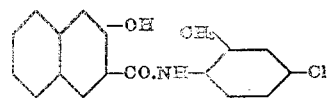

3. Process consisting in causing the diazo compound of a base of the formula:

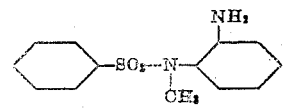

to act upon an acid amide of the following composition:

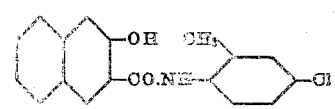

4. As new products, compounds of the following formula:

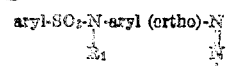

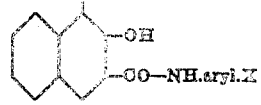

wherein $R_1$ stands for an alkyl or aralkyl group, the hydrogen atoms of the aryl group may be substituted, and X stands for hydrogen or the atomic grouping:

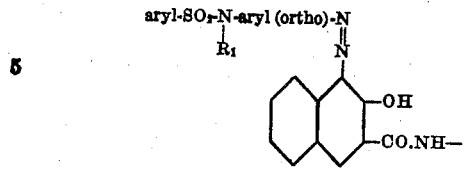

wherein the hydrogen atoms of the aryl groups may be substituted and $R_1$ stands for an alkyl or aralkyl group, said compounds being dyestuffs of varied red tints, insoluble in water, recrystallizable from glacial acetic acid, and soluble in concentrated sulfuric acid to a red solution.

5. As new products, compounds of the following formula:

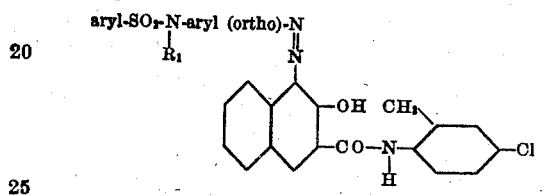

wherein $R_1$ stands for an alkyl or arolkyl group and the hydrogen atoms of the aryl groups may be substituted, said compounds being dyestuffs of varied red tints, insoluble in water, recrystallizable from glacial acetic acid, and soluble in concentrated sulfuric acid to a red solution.

6. As a new product, the compound of the following formula:

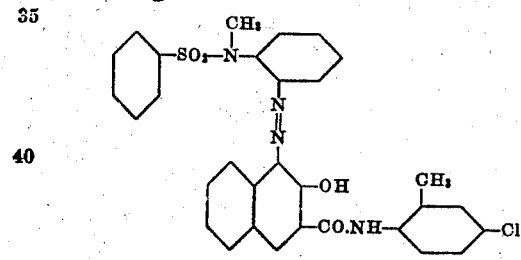

the said compound being a bright red dyestuff, insoluble in water, crystallizable from glacial acetic acid in the form of red needles and soluble in concentrated sulfuric acid to a red solution.

In testimony whereof, I affix my signature.

OTTO SOHST.